G. H. REYNOLDS.
Rock-Drill Tripod.

No. 164,396. Patented June 15, 1875.

Witnesses. Inventor.
Geo H Reynolds

UNITED STATES PATENT OFFICE.

GEORGE H. REYNOLDS, OF NEW YORK, N. Y., ASSIGNOR TO HIMSELF, CORNELIUS H. DELAMATER, AND GEORGE H. ROBINSON, OF SAME PLACE.

IMPROVEMENT IN ROCK-DRILL TRIPODS.

Specification forming part of Letters Patent No. 164,396, dated June 15, 1875; application filed April 7, 1875.

*To all whom it may concern:*

Be it known that I, GEORGE H. REYNOLDS, of New York city, in the State of New York, have invented certain Improvements relating to Rock-Drill Tripods, of which the following is a specification:

The following is a description of what I consider the best means of carrying out the invention.

The accompanying drawings form a part of this specification.

Figure 1:
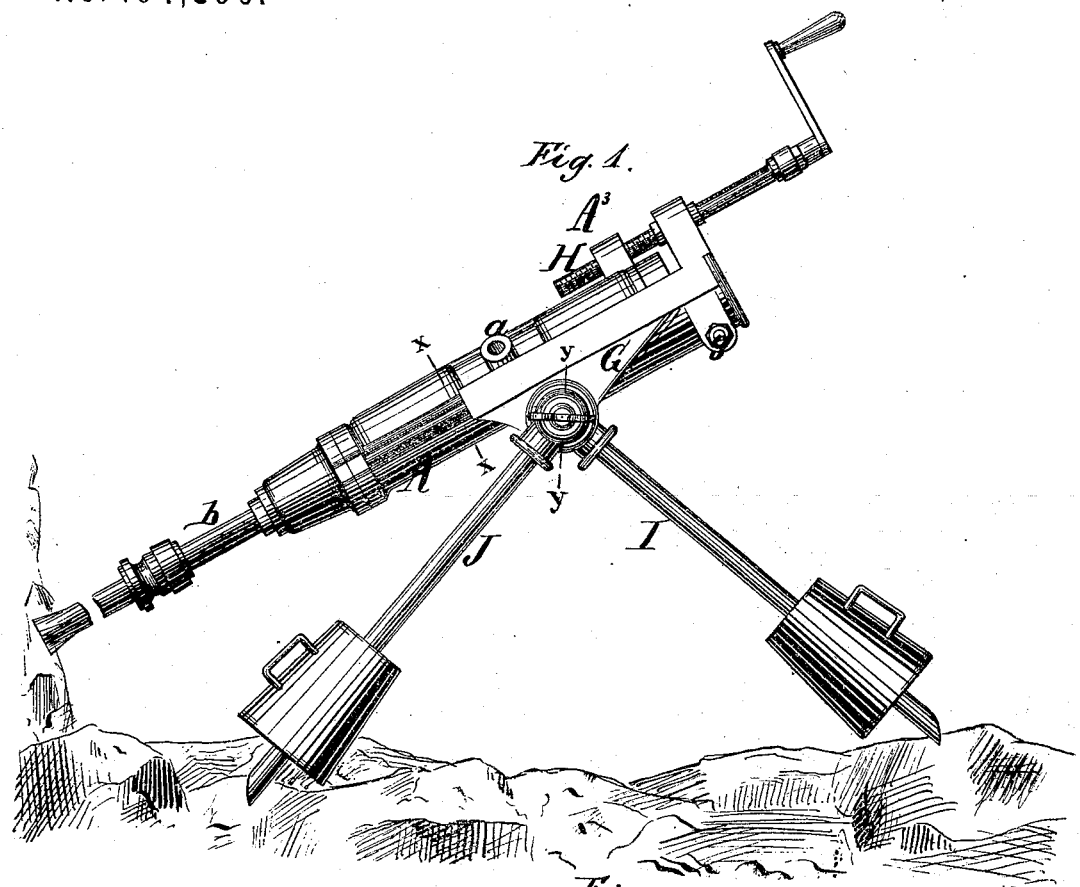
Figure 2:
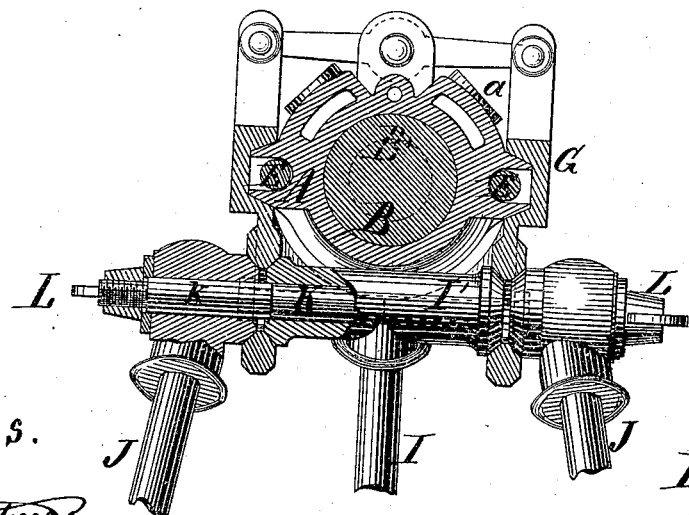

Figure 1 is a side elevation, showing the entire machine. Fig. 2 is a cross-section on a larger scale. The upper part of this figure is a section on the line $x\ x$ in Fig. 1. The lower part is a section on the line $y\ y$ in the same figure.

Similar letters of reference indicate like parts in all the figures.

I will indicate the main casting, which forms the cylinder, by the single letter A, distinguishing certain parts thereof by additional marks $A^1$ $a'$, &c., if necessary. B is a piston, formed with a deep annular recess around its center, as indicated by $B^*$. The piston-rod $b$ extends out through a peculiar stuffing-box, which is equipped with elastic material, adapted to serve as a spring in case the piston should tend to move too far in either direction.

Although I use the word steam with reference to the fluid used, it will be understood that it may be compressed air, or any other suitable elastic fluid, suitable means being employed to compress the air, or evolve carbonic acid or other elastic fluid for the purpose.

The metal of the cylinder A, adjacent to the bolts E, is properly finished to form guides or slides. These glide in corresponding slides formed in the cradle G, which latter is made in halves secured together by a bolt, $g$. A feed-screw, H, mounted in a cross-piece properly secured to the cradle G, is tapped through a lug, $A^3$, formed on the cylinder A, as represented, and allows the latter to be moved forward and backward by turning the feed-screw H, which may be done by hand or by machinery as the work proceeds. The tripod-legs I J J are supported and adjusted by means of a peculiarly-formed bolt, K, which extends through the cradle G. On the bolt K are two square places, $k$, each of which is received in a corresponding square hole in each of the legs J. The third leg I is mounted on a cylindrical portion of the bolt K, and may be adjusted in any required position when the nuts L on the ends of the bolt K are loosened. So, also, the bolt K and the legs J J may be turned in any required position when the nuts are loosened; but the two legs J J cannot be turned independently of each other, by reason of the fact that they are both rigidly set on square portions of the bolt K. The inner faces of the legs J J are made conical, and each fits in a corresponding conical recess in the cradle G. The T-piece or cross-piece at the head or upper end of the leg I is finished with conical ends, which fit into corresponding recesses in the inner faces of the cradle G.

After loosening either or both the nuts L the leg I may be set at any required angle to the legs J, and the entire cradle G and its contents may be inclined in any required position, according to the direction of the hole to be drilled. Then, by tightening the nut or nuts L, the whole is rigidly set in that position, and, on admitting the elastic fluid through the passage $a$, from a strong hose or other conduit, (not represented,) the piston and its attached drill commences to reciprocate rapidly in the proper line, and the attendant, by turning the feed-screw H, drives forward the entire cylinder and its contents, as he finds that the hole is excavated.

All previous devices known to me for adjusting the angle of the drill in relation to the legs, or the position of the legs with regard to each other or to the drill, require the loosening and tightening of two or more separate bolts. In practice the changes required are very frequent, almost constant. It is essential that two of the legs be by some means firmly connected together, as it is found not safe to loosen all three of the legs, and set the whole entirely at liberty. My device fulfills all these conditions, and makes the line of direction of the drill and the position of the back leg and of the front pair of legs adjustable within every possible limit by the slacking of a nut on either end of the single bolt K. A large proportion of the work is done in tunnels and narrow cuts, where the drill is liable to operate with one side very close to a solid wall of rock; so it is of advantage to be able to liberate from either side.

It will be understood that when the drill is in use massive weights should be mounted upon the legs I J J, and that all the usual accessories may be employed.

What I claim as new in rock-drill tripods, and desire to secure by Letters Patent, is—

1. The frame or cradle G, made in two separate pieces, and adapted to be pinched or clamped by the legs, as specified.

2. The confining-bolt, in combination with the legs and cradle, the bolt performing the double office of holding the legs I J J and supporting the two sides of the cradle G, as specified.

3. The leg I, with its cross-piece I', adapted to serve as one of the legs of the tripod, and also as a support for the cheeks of the frame G, as herein specified.

4. The legs J J, fitted rigidly upon the bolt K, in combination with a suitable supporting and guiding frame, G, and with one or more legs, I, adjustable thereto, as specified.

5. The combination of the legs J J and leg I with the inclosed parts of the cradle G, and with the bolt K and tightening means L, the legs having conical bearings, and entering conical recesses in the faces of the cradle, substantially as and for the purposes herein set forth.

In testimony whereof I have hereunto set my hand this 1st day of April, 1875, in the presence of two subscribing witnesses.

GEO. H. REYNOLDS.

Witnesses:
WM. C. DEY,
M. A. VAN NAMEE.